United States Patent [19]
Jouas et al.

[11] Patent Number: 5,805,767
[45] Date of Patent: Sep. 8, 1998

[54] ELECTRONICALLY-CONTROLLED HEATER

[76] Inventors: Gary Jouas, 19203 N. 39th Way, Phoenix, Ariz. 85024; Guy Deluca, 14232 N. 43rd St., Phoenix, Ariz. 85032; Phillip G. Tassicker, Box 125 Export Park, Adelaide Airport SA. 5950, Australia; Herbert K. Streich, 10453 N. 118th Pl., Scottsdale, Ariz. 85253

[21] Appl. No.: 585,098

[22] Filed: Jan. 16, 1996

[51] Int. Cl.⁶ .................................................... F24H 3/00
[52] U.S. Cl. ...................... 392/373; 392/360; 219/506; 219/518
[58] Field of Search ..................... 392/373–376, 392/365–368, 360, 383, 370; 219/506, 518, 510; 340/589, 540; 116/DIG. 22

[56] References Cited

U.S. PATENT DOCUMENTS

| | | |
|---|---|---|
| 2,963,627 | 12/1960 | Buschbaum . |
| 3,450,862 | 6/1969 | Kralovec, Jr. ............................ 219/494 |
| 3,560,970 | 2/1971 | Kamimura et al. . |
| 3,594,546 | 7/1971 | Smillie et al. ........................... 392/360 |
| 3,916,152 | 10/1975 | Hinman .................................. 392/379 |
| 4,633,062 | 12/1986 | Nishida et al. . |
| 4,661,720 | 4/1987 | Cameron, Jr. et al. . |
| 4,755,653 | 7/1988 | Townsend et al. . |
| 4,775,913 | 10/1988 | Ekblad .................................... 219/519 |
| 4,827,627 | 5/1989 | Cardoso . |
| 4,906,818 | 3/1990 | Lumpp et al. . |
| 5,007,103 | 4/1991 | Tyrrell et al. . |
| 5,083,011 | 1/1992 | Munroe . |
| 5,163,234 | 11/1992 | Tsukamoto et al. .................... 392/380 |
| 5,245,691 | 9/1993 | Wu . |
| 5,278,936 | 1/1994 | Shao . |
| 5,281,961 | 1/1994 | Elwell . |
| 5,291,667 | 3/1994 | Joslin et al. . |
| 5,295,531 | 3/1994 | Tsunekawa et al. . |
| 5,318,224 | 6/1994 | Darby et al. . |
| 5,345,471 | 9/1994 | McEwan . |
| 5,361,070 | 11/1994 | McEwan . |
| 5,380,985 | 1/1995 | Graham . |

FOREIGN PATENT DOCUMENTS

| | | |
|---|---|---|
| 3011678 | 10/1981 | Germany . |
| 3147085 | 6/1983 | Germany . |
| 57-49094 | 3/1982 | Japan . |
| 59-209399 | 11/1984 | Japan . |
| 60-186630 | 9/1985 | Japan . |
| 62-202945 | 9/1987 | Japan . |
| 63-135713 | 6/1988 | Japan . |
| 63-284611 | 11/1988 | Japan . |
| 2-197727 | 8/1990 | Japan . |
| 3-20565 | 1/1991 | Japan . |
| 4-64396 | 2/1992 | Japan . |
| 4-256798 | 9/1992 | Japan . |
| 5-106853 | 4/1993 | Japan . |
| 6-142009 | 5/1994 | Japan . |

*Primary Examiner*—Tu B. Hoang
*Attorney, Agent, or Firm*—Schiff Hardin & Waite

[57] ABSTRACT

A heater, especially a portable electric space heater, that includes safety features selected from at least one of the following, which may turn off the heater or trigger an alarm or both: motion sensors for determining whether an object is within an unsafe distance of the heater; temperature sensors for determining whether the internal temperature of the heater is rising too fast, or is too much above ambient temperature so that it represents an unsafe condition, or is above a preset safe level.

36 Claims, 7 Drawing Sheets

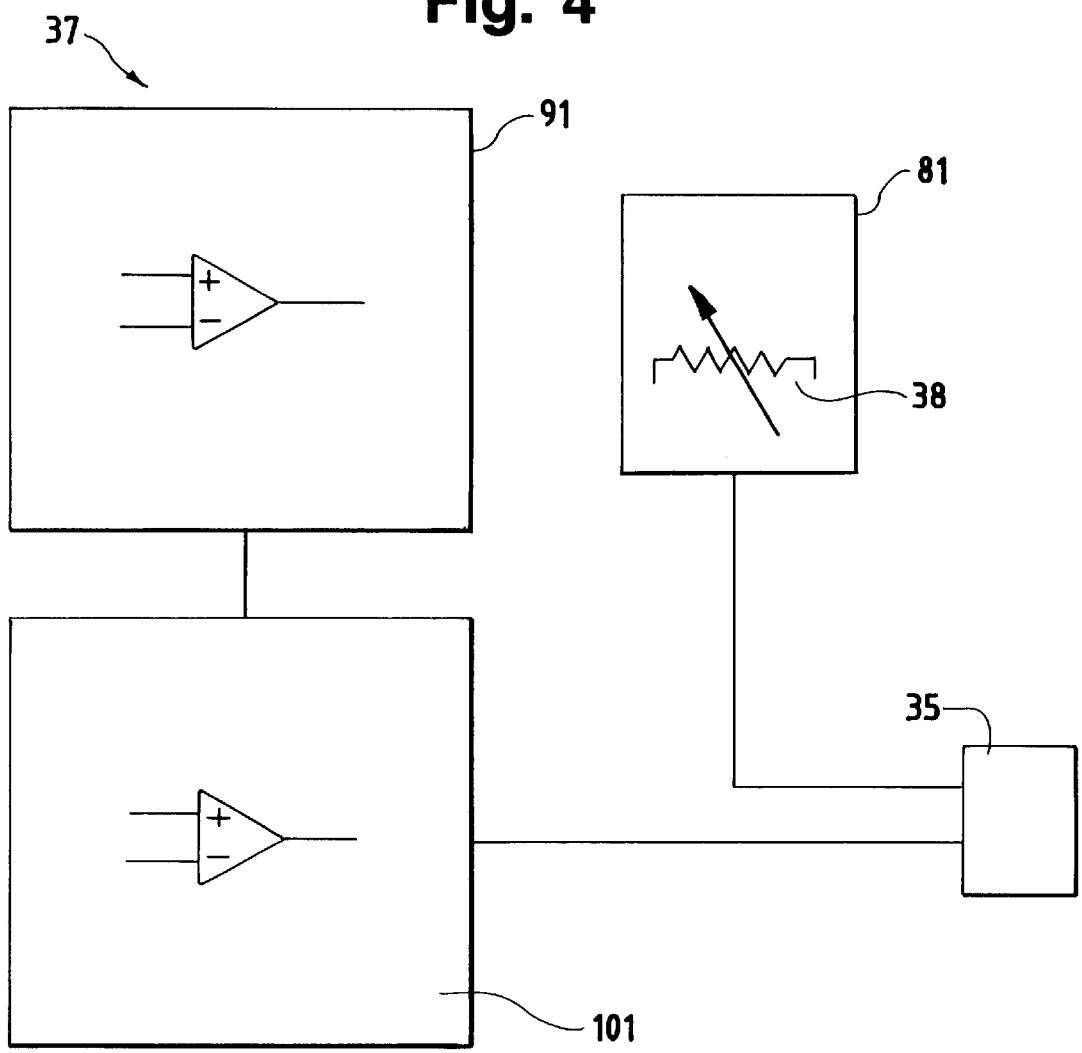
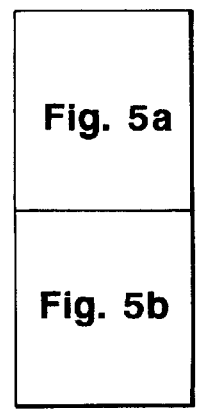

ELECTRONICALLY-CONTROLLED HEATER

BACKGROUND OF THE INVENTION

The present invention relates to heaters (especially portable and other space heaters), and more particularly to heaters having electronic controls for operating and engaging various safety and convenience features of the heater.

Space heaters typically are used in situations where localized heating is desired. In many households, a lower general heat setting is maintained for the entire home, and one or more space heaters are used for additional warmth in the room or rooms of individuals who require greater warmth. Similarly, space heaters often are used by office workers who desire additional warmth, but have no control over the heat setting of their workspaces. In both instances, space heaters not only make the individuals using them more comfortable; they also help to reduce the expense of maintaining an unnecessarily high temperature throughout the entire home or office building.

A typical space heater employs one or more heating elements housed in a heat-resistant housing, and often includes a fan for forcing air over the heating elements. In most such designs, the heater has a conventional thermostat to select an ambient room temperature setting, so that the heating elements will energize and deenergize as appropriate to maintain the set temperature. The thermostats used in these heaters generally have no markings to indicate numerically the actual temperature setting. In practice, users generally select a thermostat setting that they know from prior experience to be satisfactory, or they go through a trial-and-error procedure whereby they eventually determine the most suitable and comfortable setting.

For many years manufacturers have designed space heaters with the goal of preventing injury. Some manufacturers have included safety features that deenergize the heating elements in the event that the heater tips over, overheats, or both. Many space heaters also provide lights and audible alarms to visually and aurally indicate an abnormal operating condition. Such designs, exemplified by U.S. Pat. Nos. 4,755,653, 5,007,103 and 5,245,691, may include an alert system in which overheat and tip-switches activate audible and visual alarm signals, and also deenergize the heating elements. Another space heater design, as disclosed in U.S. Pat. No. 4,906,818, has a tip-switch and a mechanical switch to deenergize the heater when an article is draped over the heater. U.S. Pat No. 5,083,011 describes a space heater that includes a temperature-limit safety switch in combination with a pressure switch that keeps the heating elements activated while air flows through the heater housing. In the event that the air flow-rate drops below a certain level, which may happen if the heater tips over and causes the heater opening to be blocked, the pressure switch deenergizes the heating elements. Finally, U.S. Pat. No. 5,278,936 discloses a microprocessor-controlled space heater. The heater includes a thermistor for monitoring the ambient room temperature, and an LCD device capable of numerically displaying both the ambient room temperature and the thermostat setting selected by the user. Disadvantages particular to this heater are that the LCD display shows only numeric data and may be difficult to read from a distance or in the dark. Although this heater does provide several convenience features such as a temperature recall switch and an energy saving mode, it does not include any additional safety features beyond those that have previously been described in relation to the other heaters.

The safety features of the described space heaters are purely reactive in nature. For example, the space heater element described above deactivates only after the heater has been tipped over or has overheated. The buzzer and lights described above activate only under the same sort of condition. Thus, while the present safety systems are adequate, better, proactive safety systems are desirable to improve the operating safety of heaters.

SUMMARY OF THE INVENTION

The invention comprises an electronically-controlled space heater including a heating means for generating heat in response to an electrical current and further includes one or more of the following features for deenergizing the heating means when an abnormal condition is detected, or for signalling an alarm in response to such a condition, or both: a motion detection means for determining whether motion having predefined characteristics is taking place within the space near the front of the heater; a temperature sensing means for detecting the internal temperature of the heater; and, a temperature sensing means for detecting the rate of the temperature rise of the heater and for detecting the difference between an internal temperature (as defined below) of the heater and the ambient room temperature. The various temperature sensing means referred to above and throughout this application may be embodied in a single temperature sensing device performing multiple functions, or may be multiple devices each performing one or more functions.

It is therefore an object of the invention to deenergize the heating element and/or trigger an alarm system when an internal temperature of the heater exceeds the ambient room temperature by a predetermined amount.

Another object of the invention is to deenergize the heating elements and/or trigger an alarm signal when the rate at which the internal temperature rise of the heater exceeds a predetermined rate.

A further object of the invention is to deenergize the heating elements and/or trigger an alarm signal when motion is detected near the front of the heater.

It also is an object of the invention to visually and/or aurally indicate the heater's thermostat settings, operating modes, and/or alarm conditions.

Still a further object of the invention is to provide a system whereby the space heater automatically turns on or off after predetermined time intervals.

BRIEF DESCRIPTION OF THE DRAWINGS

FIG. 4 shows a system level circuit diagram of the sensor board of a preferred embodiment.

DETAILED DESCRIPTION OF A PREFERRED EMBODIMENT

The present invention is described below in reference to an electric space heater. It will be understood, however, that the invention may be applied equally well to other types of heaters in which safety features such as those described will be useful. Thus, in addition to electric space heaters, the invention may be applied to kerosene heaters and to portable heaters.

Figure 1:
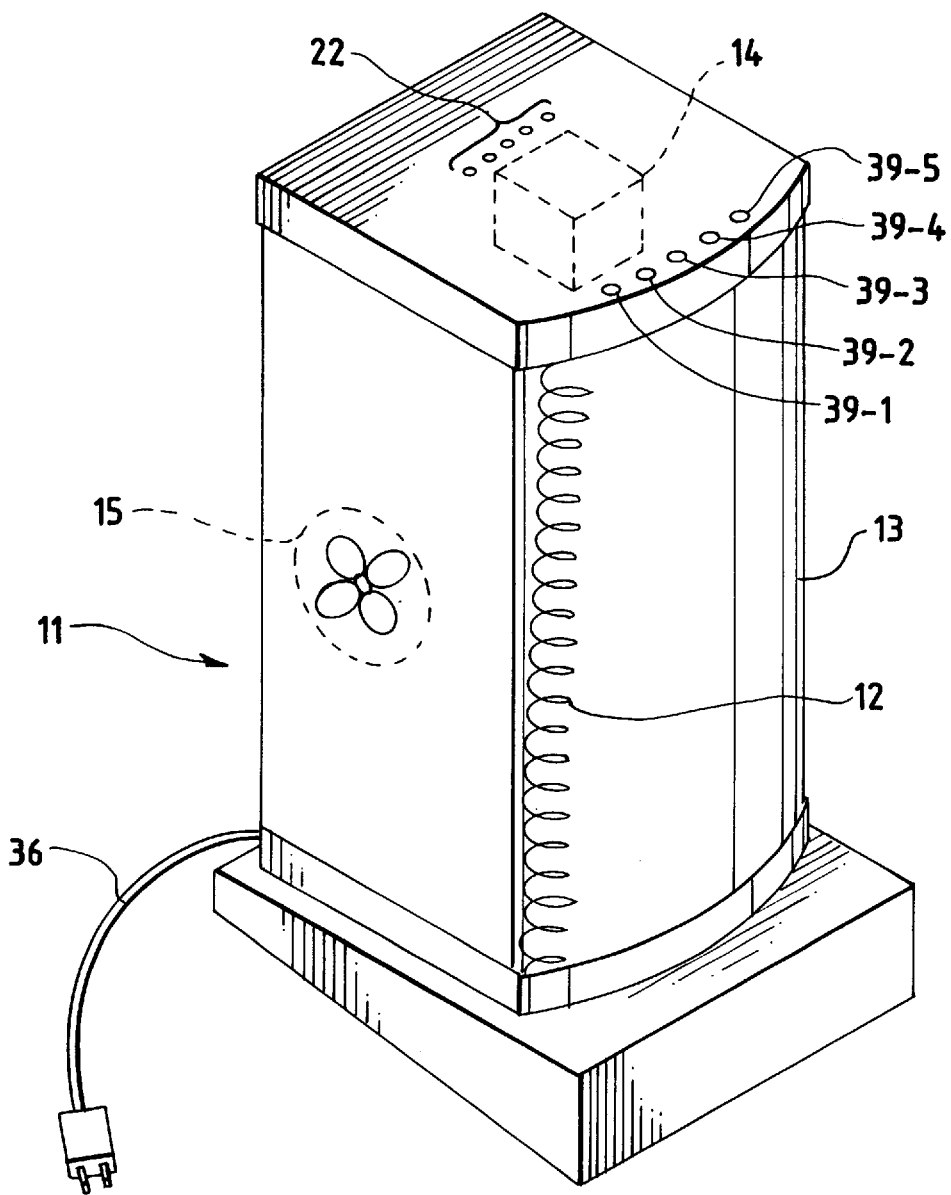
FIG. 1 shows an elevational view of a preferred embodiment of the invention.

As shown in FIG. 1, a preferred embodiment of the invention comprises a space heater 11 including a heating element 12 (such as a radiant coil, an electrical resistance heating element, an electrically-controlled gas or kerosene burner, or other type of heating element) disposed within a housing 13, and a controller module 14. The housing 13 is made from materials that are sufficiently heat resistant to withstand the heat generated by the heating element 12. A controller module 14 is associated with one or more display elements, such as light emitting diodes (LEDs) 22, which, as will be discussed below, can be used to display the thermostat setting, provide visual feedback as to the operational mode of the heater 11, or indicate an alarm situation. Other display elements, such as LCD displays or incandescent lights, may be used. A power indicator, such as LED 23, also may be provided to indicate that controller module 14 is active and/or to indicate that timer mode (discussed below) has been entered. Controller module 14 also includes at least one mode selector switch, shown in the drawings as a plurality of mode selector switches 39-1 through 39-5 that are used in various combinations as the ON/OFF selector, thermostat temperature selector, time selector, and motion sensing selector. These features are discussed below in greater detail.

Figure 2:
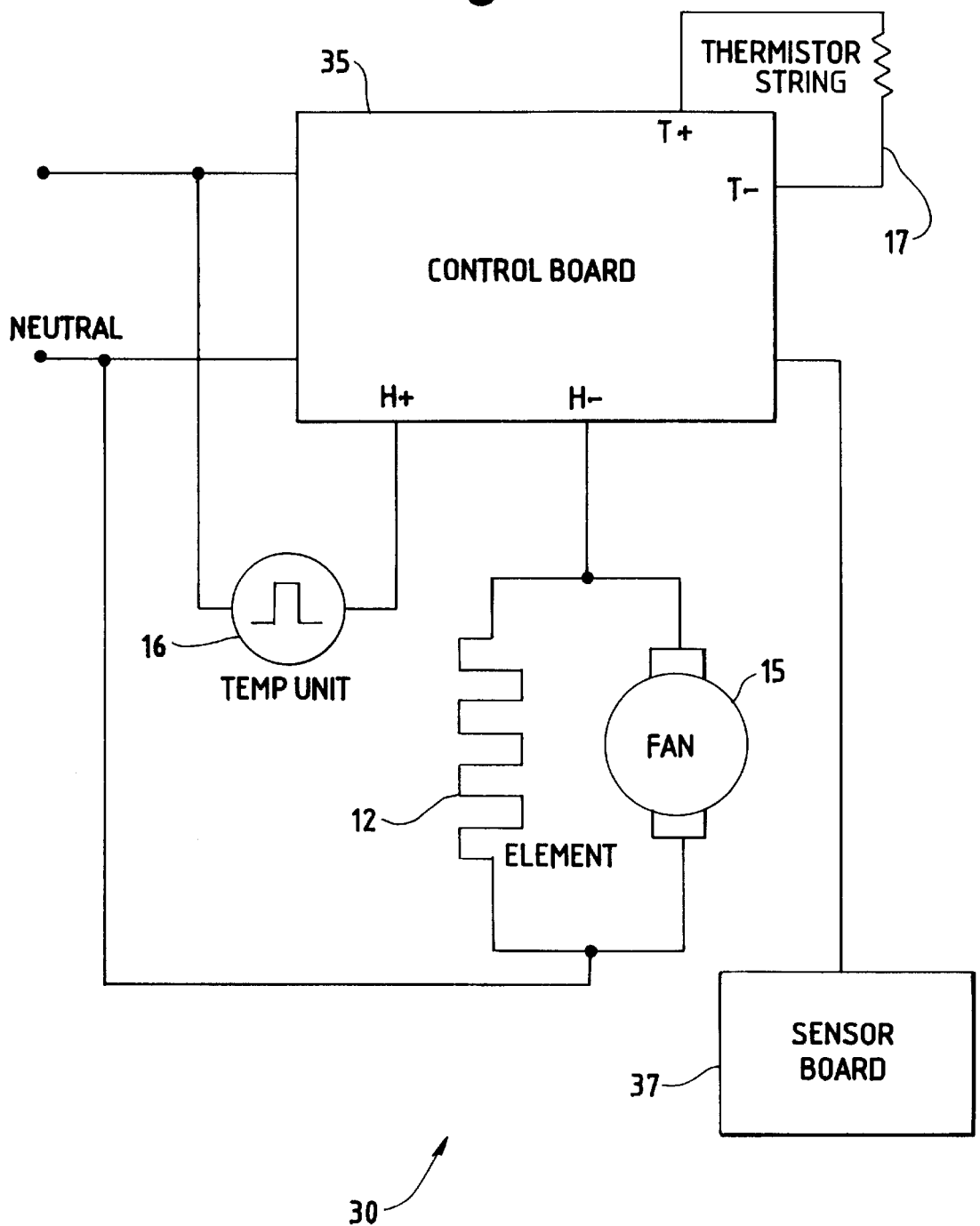
FIG. 2 shows a system level circuit diagram of the electrical circuit of a preferred embodiment.

FIG. 2 shows schematically the electrical circuit 30 of the heater 11. Circuit 30 includes a printed circuit control board 35. Electricity is supplied to the control board 35 from a power source (not shown) through a power cord 36. Electricity also is used to energize the heating element 12 and, optionally, a fan 15 that are connected to the control board 35. The fan 15 is used to force cool air from the inlet over the heating elements and out of the housing 13. A temperature-limit switch 16 is connected between the power source and heating element 12 to deenergize the heating element 12 by opening the circuit to the heating element 12 and fan 15 if the internal temperature rises above a preset reference temperature. Temperature-limit switch 16 is intended to function primarily as a fail-safe safety feature in the event that other temperature-regulating safety features fail to shut off the heater 11 when necessary.

Figure 3:
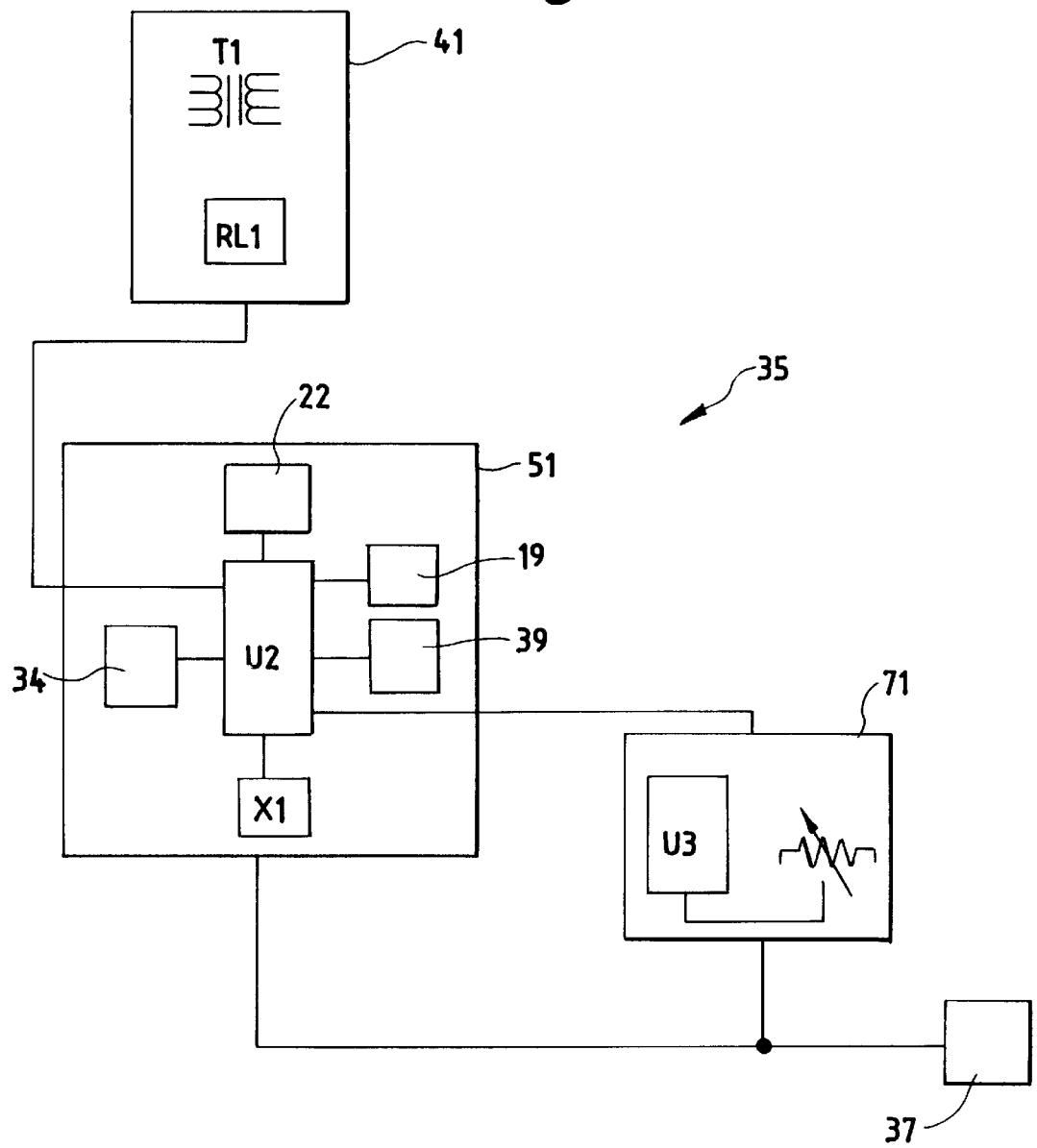
FIG. 3 shows a system level circuit diagram of the control board of a preferred embodiment.

FIG. 3 shows control board 35 schematically and in greater detail. Control board 35 includes a first control block 41. A transformer T1 in block 41 provides a stepped-down AC voltage to a standard bridge rectifier/filter capacitor circuit to convert the AC current from power cord 36 to DC (at, for instance, 9 volts). This DC voltage may be passed through a voltage regulator, such as a 7805, in order to further reduce and regulate the DC voltage. The DC voltage is used to supply power to the electronic components. The AC current source from power cord 36 is used to provide the power necessary to energize the heating element 12 and fan 15. In the embodiment shown in the figures, the DC power source is used to energize a relay RL1 that is connected between the heating element 12 and fan 15 and the AC current source from power cord 36. This arrangement allows the control circuitry to energize and deenergize the heating element 12 and fan 15 in response to various operating conditions detected by the heater, as discussed below. Solid-state switching devices (such as a triac) of suitable power-handling capability also may be used to control the power delivered to the heating element 12 and fan 15. A microcontroller U2, as described more fully below, provides a control signal that determines when the relay RL1 is opened or closed in order to energize or deenergize the heating element 12 and the fan 15.

Control board 35 also includes a second control block 51 that includes microcontroller U2, such as a Zilog Z86C30. Other devices, such as microprocessors, application-specific integrated circuits (ASICs), programmable gate arrays, programmable logic arrays, and even discrete components may be used as alternatives to microcontroller U2. One or more heater operating modes are selected by depressing mode selector switches 39 individually or in combination. This action causes microcontroller U2 to execute pertinent portions of a pre-programmed software algorithm discussed below. Microcontroller U2, in addition to other functions, performs the input and output functions necessary for temperature sampling, monitors signals from the sensor board 37, and a tilt switch 19 that preferably is included in the heater 11 to detect when the heater is not standing in a proper operating position. Microcontroller U2 also preferably is interfaced to one or more alarm devices, which may include a buzzer 34 that emits different sounds in response to alarm situations (such as tip-over, motion near the heater, or overheat) or a visual alarm means such as LEDs 22, or both. The alarm device also may provide aural feedback to indicate when various heater modes are set, or when mode selector switches 39 are depressed. For example, in the embodiment shown, tilt switch 19 activates if the heater 11 tilts beyond a predetermined angle, which in turn signals the microcontroller U2 to deenergize the heating element 12 and fan 15 while sounding the buzzer 34.

Microcontroller U2 also is interfaced to the LED array 22 that preferably illuminates in different patterns in accordance with the timer setting, thermostat setting, motion-sensing setting, and alarm situations. A limited number of LEDs may be used to provide a visual display of temperature or other conditions of the heater, and each LED duty-cycled at different rates to provide a display unique to a particular condition. For example, if each LED may be duty-cycled at three different rates, each LED in the array may appear at one of three different levels of brightness (or off), thereby permitting the LED array 22 to indicate many different settings and patterns.

Control board 35 also includes analog-to-digital converter (ADC) circuitry shown as ADC control block 71. The ADC 71 is used to convert analog voltage levels into digital numbers for use by microcontroller U2. Any commercially available discrete ADC, such as an ADC0804 also may be used for this purpose. The ADC 71 allows microcontroller U2 to interpret and respond to data collected from attached sensors.

Control board 35 is connected to a first thermistor 17 and a sensor board 37. Thermistors 17 and 38, like other thermistors commonly found in industry, have a resistance that varies inversely with temperature. Thermistor 17 is interfaced to the ADC 71 to provide to microcontroller U2 temperature information about the space near the heating element 12 where thermistor 17 is located; this temperature will be referred herein as the "internal temperature" of the heater. Temperature sensing alternatively may be accomplished using other commercially available devices, such as thermocouples, solid-state temperature sensors and RTDs.

Preferably also interfaced to ADC 71 is a circuit that monitors the AC voltage that is impressed upon the heating element 12 and fan 15 when relay RL1 is closed. This circuit produces a DC voltage that is proportional to the average of the AC voltage supplied to the heating element 12. Because the wattage of the electric heating element 12 is related to the voltage across it, this circuit provides the microcontroller U2 with a means of determining whether a rise in the temperature sensed by thermistor 17 is the result of a corresponding rise in the voltage supplied to heating element 12, rather than the result of abnormal conditions such as a blockage in front of the heater or an inoperative fan. Microcontroller U2 analyzes the average AC readings and, if a sudden rise in voltage is detected, ignores the corresponding rise in temperature sensed by thermistor 17.

A second thermistor 38 is located within the heater 11 (preferably on sensor board 37) to provide information relating to the ambient temperature of the heater's environment, and thus should not be in a location significantly affected by heat generated by heating means 12. Like first thermistor 17, second thermistor 38 also is interfaced to the ADC 71, so that ambient temperature information is provided to microcontroller U2.

In the embodiment shown, microcontroller U2 will deenergize the heating element 12 if (i) the internal temperature sensed by thermistor 17 increases at an excessive rate, such as a rise of more than 10° F. in any 10 second period, (ii) the internal temperature exceeds the ambient temperature by an excessive amount such as 145° F., or (iii) the internal temperature exceeds an absolute temperature such as 250° F. The values against which the internal temperature is compared using microcontroller U2 are selected to provide safe heating and are used to detect an abnormal heating condition such as a blocked outlet or inoperable fan. Of course, it is not necessary to program microcontroller U2 to detect all of these abnormal conditions, and the selection of which conditions will be detected in a given heater is at the discretion of the designer.

When the heating element 12 is deenergized in response to an abnormal heating condition in the embodiment depicted in the drawings, microcontroller U2 will direct the LED array 22 to flash on and off, and the buzzer 34 will sound loudly. This state is known as "manual reset mode," because it preferably requires the user to press one or more of the mode selector switches 39-1 through 39-5 to deactivate the visual and aural alarm. The heater 11 then may be reactivated as desired.

Referring to FIG. 4, sensor board 37 preferably also includes a motion detector means that signals the microcontroller U2 if motion is detected too close to the heater 11. One or more motion detector means may be employed so that motion is detected on all sides of the heater, or in only selected directions (such as in front of the heater). The preferred motion detector means is commonly found in industry, and is referred to as a "field disturbance sensor." This type of sensor employs a microwave oscillator of which the resonant frequency is affected by objects of sufficient mass and velocity moving in the vicinity of the oscillator. The effect an object has on the oscillator is directly proportional to the object's mass and speed, and inversely proportional to the object's distance from the oscillator. These frequency changes cause voltage fluctuations in the oscillator which then are amplified and used to convey motion information. In place of the field disturbance sensor described, it is believed that other types of motion or proximity sensing may be used, such as microwave motion detectors, ultrasonic motion detectors and passive infrared motion detectors.

Figure 6:
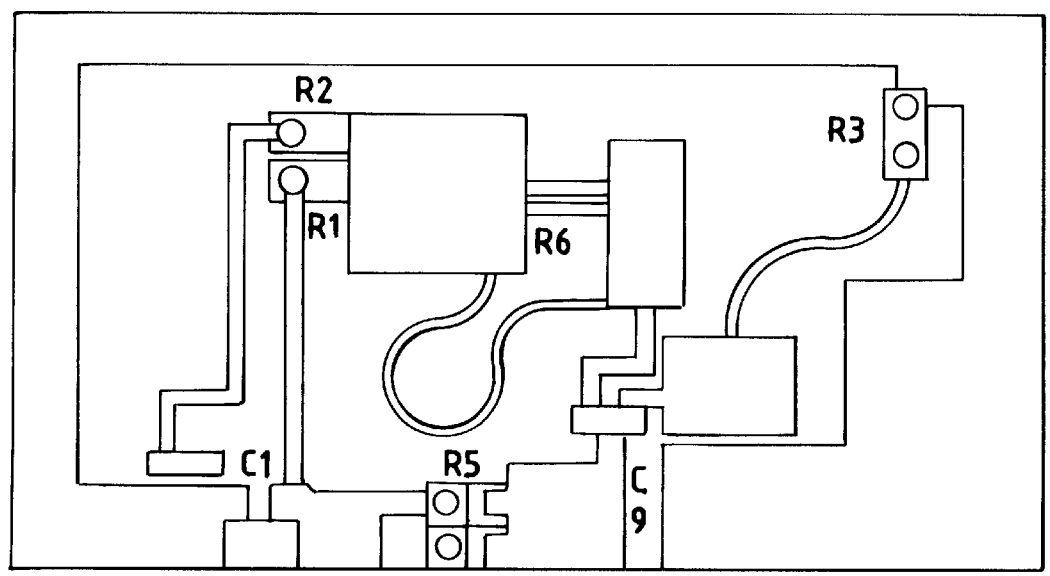
FIG. 6 shows the motion sensor used in a preferred embodiment of the invention.

In the embodiment shown in FIG. 4, the motion detector means includes an oscillator embodied in circuit traces that preferably are etched on one side of a printed circuit board as depicted in FIG. 6. The particular circuit shown has been empirically designed to detect objects of average masses moving at average speeds. As a result, the circuit is able to detect, for such objects, the proximity of the object to the heater. Accordingly, the motion detector found on sensor board 37 preferably includes a sensor block 91 that functions as a "far zone" detector and as a "near zone" detector to roughly correspond to the relative distances of objects from the heater. It should be understood, however, that the difference between these blocks is not actually in their ability to detect differences in proximity, but rather, differences in the magnitude of frequency variation caused by masses that move in proximity to the heater. Accordingly, the motion detector found on sensor board 37 preferably includes a sensor block 91 that determines the magnitude of the frequency variation due to the detected motion which is then classified as either a "near zone" disturbance (large magnitude) or "far zone" disturbance (small magnitude). "Near zone" disturbances are generally small, relatively fast moving objects near the heater or large, slower moving objects farther from the heater. "Far zone" disturbances are all other detected motion which results in a frequency variation below the minimum value for it to be classified as a "near zone" disturbance, and meeting a minimum threshold for detection. Certain motion may be outside the thresholds of detection of a particular motion sensing means, which should be set as described above.

In an embodiment of the invention, the LED array 22 illuminates in a sweeping pattern when motion sensing is enabled. If the sensor detects motion of predefined characteristics (with respect to the magnitude of disturbance in the case of a field disturbance-type motion sensor, or in the case of predefined distances, directions, and/or speeds in other cases) as a far zone disturbance, the sweep rate of the LED array 22 increases and the buzzer 34 beeps softly in warning. If further motion is not detected, buzzer 34 stops beeping and LED array 22 returns to the "normal" sweep rate. If further motion is detected, and is of a magnitude recognized by microcontroller U2 as a "near zone" disturbance, an alarm signal is generated, e.g., an L.E.D. array 22 blinks on and off, and/or a buzzer 34 sounds a louder warning. (Other signalling devices also may be used without departing from the invention.) Unless the program is interrupted by depressing a switch to temporarily disable the circuit so that the temperature or other features may be reset, heating element 12 and fan 15 are deenergized after a preset time interval, and heater 11 enters the manual reset mode described above. The time interval between near zone detection and action upon the mode selector switches allows a user to make adjustments to the heater, while at the same time making it difficult for a small child to prevent an alarm once the near zone detector is triggered.

A timer function also may be provided to automatically activate or deactivate the heater 11 after a selected time interval. This timer function may be performed by microcontroller U2 using an oscillator X1 that is present within the microcontroller, or by other time-measuring means (such as an RC timing circuit, or mechanical timer). Mode selector switch 39-5 is used to enter delay times into microcontroller U2, after which the heater 11 becomes active or inactive. In the depicted embodiment, when timer set mode is active, power LED 23 flashes on and off, and the LED array 22 indicates the desired amount of delay time.

If the timer is to be used to set a delay time after which the heater 11 is to turn off ("off time"), mode selector switch 39-5 must be pressed when unit is on. This causes power LED 23 to flash on and off, indicating the microcontroller U2 is in timer set mode. In addition, the LED array 22 illuminates to indicate an off time of one time increment. Time increments can be any value deemed desirable (such as 1 hour or 2 hours per increment). Each subsequent press of mode selector switch 39-5 causes the buzzer 34 to "pip" and the next LED in the LED array 22 to illuminate, indicating an additional increment of off time. When all LEDs of LED array 22 are illuminated, a maximum off time is indicated. A subsequent press of mode selector switch 39-5 turns off all the LEDs in LED array 22, indicating no off time. Subsequent presses of mode selector switch 39-5 repeat the sequence. If mode selector switch 39-5 is not pressed within a certain time, the current setting is accepted and LED array 22 returns to its previous state. If a non-zero off time is set, power LED 23 continues to flash indicating an active timer setting. If no off time was set, power LED 23 returns to its previous state. The heater 11 will continue to operate normally until the off time has passed, at which point the heater 11 will turn off.

If the timer is to be used to set a delay time after which the heater 11 is to turn on ("on time"), mode selector switch 39-5 must be pressed and held for a certain time while the heater 11 is off. Power LED 23 flashes on and off to indicate timer set mode, the LED array 22 illuminates, and on time is set in the same manner as off time. If mode selector switch 39-5 is not pressed within a certain time, buzzer 34 sounds a "pip" and the current setting is accepted. If a non-zero on time is set, power LED 23 flashes on and off indicating an active timer setting and LED array 22 continues to display the on time setting, extinguishing LEDs in LED array 22 as the on time passes. After the on time has elapsed, the heater 11 will turn on and motion sensing is automatically enabled. If no on time is set, the power LED 23 and all LEDs in LED array 22 turn off, and the heater 11 remains off.

Figure 5A:
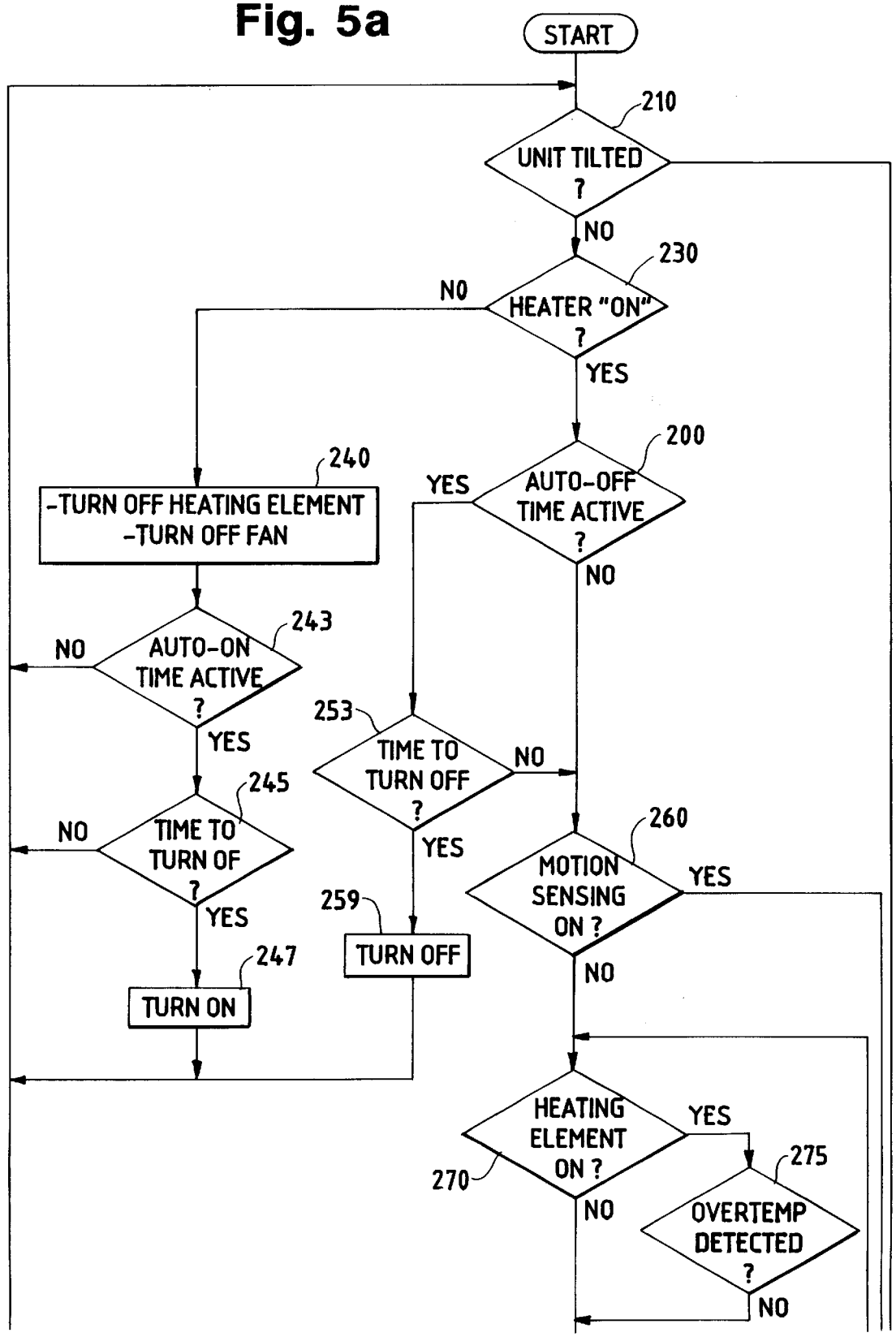
FIG. 5 is a flow diagram of the operating algorithm of the microcontroller in a preferred embodiment.
Figure 5B:
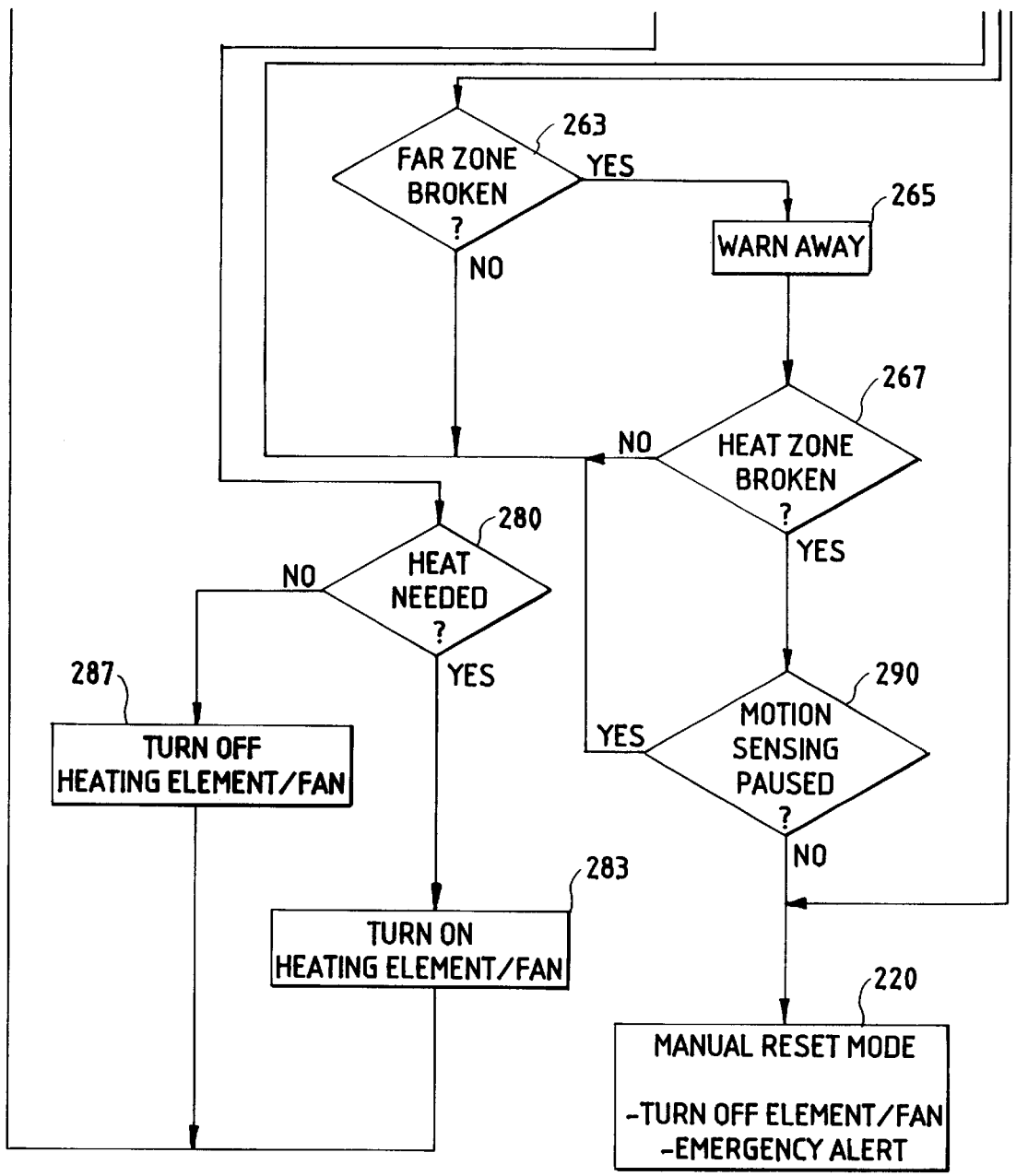

As mentioned above, microcontroller U2 is preprogrammed with an operating algorithm that processes signals from sensor board 37 and control board 35, monitors the mode selector switches 39-1 through 39-5, and controls the LED array 22 and power LED 23 to form the user interface, and controls the various functional modes of the heater. Referring to FIG. 5, the operating sequence of a preferred program now will be described. The sequence of FIG. 5 is not considered important to the invention, so long as each of the desired functions is performed. (It also should be understood that one or more of the steps described in the algorithm may be performed in hardware, rather than in software, without departing from the invention. Likewise, one or more of the functions, such as the tilt switch, may be excluded from a particular embodiment without departing from the invention.)

In block 210, microcontroller U2 first checks the status of the tilt switch 19 and the temperature limit switch 16. If it detects that the heater 11 is tilted beyond a predetermined amount or the temperature limit switch 16 has opened, then the heating element 12 and fan 15 are deenergized and the heater 11 enters the manual reset mode 220. If the heater 11 is not tilted beyond a predetermined amount and the temperature limit switch 16 has not opened, then microcontroller U2 checks to see whether the heater 11 has been turned on or off in block 230. If the heater 11 has been turned off, the heating element 12 and fan 15 are deenergized, microcontroller U2 checks to see if the timer mode is set to turn the heater 11 on automatically (in blocks 240, 243, 245, and 247). If timer mode is active, the heater 11 will turn on after the desired delay and automatically enable motion sensing. If the heater 11 is on, microcontroller U2 checks to see if timer mode is set to turn the heater 11 off automatically (in blocks 250, 253, and 257). If timer mode is set, then the heater 11 will turn off and deenergize the heating element 12 and fan 15 after the desired delay.

If heater 11 is on, microcontroller U2 checks to see if motion sensing is enabled, in block 260. If motion sensing is enabled, microcontroller U2 checks input signals from the motion detector means. If the far zone detector detects an abnormal condition (in block 263), microcontroller U2 triggers an alarm by illuminating LEDs 22 and sounding buzzer 34. Microcontroller U2 then checks whether the near zone detector detects an abnormal condition (in block 267). If so, microcontroller U2 waits for a preset time to detect whether the pause button 39-1 is pressed and held for the predetermined period (as shown in block 290), and if so, microcontroller U2 cancels the alarm, and waits for controller buttons 39-1 to 39-5 to cease being adjusted. Thereafter, motion sensing is automatically restarted after a period of time to allow the operator to leave the immediate vicinity of the heater. If mode selector switches are not operated in the preset time, heating element 12 and fan 15 are deenergized, and the heater 11 enters manual reset mode. If the near zone motion is detected and no action is taken to pause or otherwise disable the motion sensor or heater, the heater enters manual reset mode 220.

Microcontroller U2 also checks whether the heating element 12 is currently energized in block 270. If heating element 12 is energized, microcontroller U2 checks (in block 275) the rate of internal temperature rise as sensed by first thermistor 17, along with the absolute temperature sensed by thermistor 17, and the difference in the temperature sensed by thermistor 17 and the ambient room temperature sensed by second thermistor 38. These values are compared by microcontroller U2 with predetermined safe values for each of the conditions, and if any abnormal condition is detected, heating element 12 and fan 15 are deenergized, an alarm is triggered, and the heater 11 enters manual reset mode.

To change the thermostat setting ("setpoint"), mode selector switch, 39-3 or 39-2 is pressed to raise or to lower the setpoint, respectively. Buzzer 34 sounds to indicate the change, and the LED array 22 illuminates to show the current thermostat setting. When adjustment of the thermostat is complete, no further pressing of any mode selector switches 39 will cause the current thermostat setting to be accepted and microcontroller U2 will exit thermostat adjust mode. Microcontroller U2 checks whether heat is needed in block 280 by comparing the ambient room temperature sensed by thermistor 38 to the current setpoint. If heating is needed, as shown by blocks 283 and 287, heating element 12 and fan 15 are energized or remain energized; if heat is not needed, the heating element and/or fan are deenergized. At the conclusion of this last operation, the operating program of microcontroller U2 repeats the operating algorithm from the start, beginning with the check of the tilt switch 19 and the temperature limit switch 16.

Each of the various heater safety features discussed herein may be employed along or in combination with some or all of the other features. Accordingly, it should be understood that the invention described and claimed herein is not limited to an embodiment that incorporates all of the safety features that have been mentioned. Indeed, the present invention has been described with respect to certain embodiments and conditions which are not meant to and should not be construed to limit the scope of the invention. Those skilled in the art will understand that variations from the embodiment and conditions described herein may be made without departing from the invention as defined in the appended claims.

What is claimed is:

1. A heater comprising:

a portable housing;

heating element within the portable housing to heat living and other habitation spaces; and, motion detection means for determining whether motion of predefined characteristics is taking place near the heater, and for deenergizing the heating element in response to said motion.

2. The heater of claim 1, further comprising alarm means responsive to a signal generated by the motion detection means for indicating that motion was detected by the motion detection means.

3. The heater of claim 2, wherein the alarm means comprises at least one device selected from the group consisting of aural signalling devices and visual signalling devices.

4. The heater of claim 1, wherein the motion detection means is selected from the group consisting of field disturbance sensors, microwave motion detectors, ultrasonic motion detectors, and passive infrared motion detectors.

5. The heater of claim 1, further comprising a fan within the portable housing for blowing air heated by the heating means from the portable housing.

6. A heater comprising:

a portable housing:

heating means within the portable housing to heat living and other habitation spaces;

motion detection means for determining whether motion beyond a predefined threshold is taking place within the space near the heater; and, alarm means responsive to a signal generated by the motion detection means for indicating that motion was detected by the motion detection means.

7. The heater of claim 6, wherein the motion detection means is selected from the group consisting of field disturbance sensors, microwave motion detectors, ultrasonic motion detectors, and passive infrared motion detectors.

8. The heater of claim 6, further comprising a fan within the portable housing for blowing air heated by the heating means from the portable housing.

9. A heater comprising:

a portable housing;

heating element within the portable housing to heat living and other habitation spaces;

temperature sensing element for detecting the rate of the temperature rise of the heater, and for deenergizing the heating means in response to an abnormal condition manifested when the rate at which the internal temperature of the heater rises faster than a predetermined rate.

10. The heater of claim 9, wherein the temperature sensing means comprises temperature sensors selected from the group consisting of thermistors, thermocouples, solid-state temperature sensors, and RTDs.

11. The heater of claim 9, including an alarm means responsive to a signal generated by the temperature sensing means indicating the presence of the abnormal condition.

12. The heater of claim 11, wherein the alarm means comprises at least one device selected from the group consisting of aural signalling devices and visual signalling devices.

13. The heater of claim 9, further comprising a fan within the portable housing for blowing air heated by the heating element from the portable housing.

14. A heater comprising:

a portable housing;

heating element within the portable housing to heat living and other habitation spaces;

first temperature sensing means for determining an internal temperature of the heater;

second temperature sensing means for determining an ambient temperature of the space in which the heater is located; and, comparison means for determining a difference between the internal temperature and the ambient temperature, and for deenergizing the heating element in response to an abnormal condition manifested when the difference exceeds a predetermined amount.

15. The heater of claim 14, wherein the temperature sensing means comprises temperature sensors selected from the group consisting of thermistors, thermocouples, solid-state temperature sensors, and RTDs.

16. The heater of claim 14, wherein the comparison means is selected from the group consisting of microcontrollers, microprocessors, ASICs, programmable gate arrays, programmable logic arrays, and discrete components.

17. The heater of claim 14, including an alarm means responsive to a signal generated by the comparison means indicating that the abnormal condition has occurred.

18. The heater of claim 14, further comprising a fan within the portable housing for blowing air heated by the heating means from the portable housing.

19. A heater comprising:

a portable housing;

heating element within the portable housing to heat living and other habitation spaces;

temperature sensing means for determining an internal temperature of the heater; and, comparison means for determining a difference between the internal temperature and a predetermined reference temperature corresponding to an upper limit for the safe operation of the heater, and for deenergizing the heating means in response to an abnormal condition manifested when the internal temperature equals or exceeds the reference temperature.

20. The heater of claim 18, wherein the comparison means is selected from the group consisting of microcontrollers, microprocessors, ASICs, programmable gate arrays, programmable logic arrays, and discrete components.

21. The heater of claim 18, including an alarm means responsive to a signal generated by the comparison means indicating that the abnormal condition has occurred.

22. The heater of claim 19, wherein the temperature sensing means is selected from the group consisting of thermistors, thermocouples, solid-state temperature sensors, and RTDs.

23. The heater of claim 19, further comprising a fan within the portable housing for blowing air heated by the heating means from the portable housing.

24. A heater comprising:

a portable housing;

heating element within the portable housing to heat living and other habitation spaces; and, at least one safety means selected from the group consisting of (i) motion detection means for determining whether motion is taking place near the heater, and for deenergizing the heating means in response to such motion; (ii) first temperature sensing element for determining an internal temperature of the heater, and for deenergizing the heating element in response to an abnormal condition manifested when the rate at which the internal temperature of the heater rises faster than a predetermined rate; (iii) second temperature sensing means for determining an internal temperature of the heater, and for deenergizing the heating element in response to an abnormal condition manifested when the internal temperature of the heater exceeds a predetermined upper limit temperature for safe operation of the heater; and, (iv) third temperature sensing means for determining an internal temperature of the heater, fourth temperature sensing means for determining the ambient temperature of the space in which the heater is located, and a comparison means for determining the difference between the internal temperature of the heater and the ambient temperature, and for deenergizing the heating element in response to an abnormal condition manifested when this difference exceeds a predetermined amount.

25. The heater of claim 24, further comprising a fan within the portable housing for blowing air heated by the heating means from the portable housing.

26. A heater comprising:

a portable housing;

heating means within the portable housing to heat living and other habitation spaces; and, at least one safety means selected from the group consisting of (i) motion detection means for determining whether motion is taking place near the heater, and for triggering an alarm signal in response to such motion; (ii) first temperature sensing means for determining an internal temperature of the heater, and for triggering an alarm signal in response to an abnormal condition manifested when the rate at which the internal temperature of the heater rises faster than a predetermined rate; (iii) second temperature sensing means for determining an internal temperature of the heater; and for triggering an alarm signal in response to an abnormal condition manifested when the internal temperature of the heater exceeds a predetermined upper limit temperature for safe operation of the heater; and, (iv) third temperature sensing means for determining an internal temperature of the heater, fourth temperature sensing means for determining the ambient temperature of the space in which the heater is located, and a comparison means for determining the difference between the internal temperature of the heater and the ambient temperature, and for triggering an alarm signal in response to an abnormal condition manifested when this difference exceeds a predetermined amount.

27. The heater of claim 26, further comprising a fan within the portable housing for blowing air heated by the heating means from the portable housing.

28. A heater comprising:

heating element for generating heat;

motion detection means for determining whether motion of predefined characteristics is taking place near the heater, and for deenergizing the heating element in response to such motion; and, alarm means responsive to a signal generated by the motion detection means for indicating that motion was detected by the motion detection means wherein the motion detection means generates a first signal in response to far zone disturbances such that the alarm element is activated without deenergizing the heating means and wherein the motion detection means generates a second signal in response to near zone disturbances such that the alarm means is activated at about the same time the heating element is deenergized.

29. The heater of claim 28, further comprising a portable housing, the heating means being disposed within the portable housing.

30. The heater of claim 29, further comprising a fan within the portable housing for blowing air heated by the heating means from the portable housing.

31. A heater comprising:

heating element for generating heat;

motion detection means for determining whether motion of predefined characteristics is taking place near the heater, and for deenergizing the heating element in response to such motion; and, alarm means responsive to a signal generated by the motion detection for indicating that motion was detected by the motion detection means;

wherein the motion detection means generates a first signal in response to far zone disturbances such that the alarm element is activated without deenergizing the heating means and wherein the motion detection generates a second signal in response to near zone disturbances such that the alarm means is activated before the heating element is deenergized.

32. The heater of claim 31, further comprising a portable housing, the heating means being disposed within the portable housing.

33. The heater of claim 32, further comprising a fan within the portable housing for blowing air heated by the heating means from the portable housing.

34. A heater comprising:

heating element for generating heat;

temperature sensing means for detecting the rate of the temperature rise of the heater, and for deenergizing the heating element in response to an abnormal condition manifested when the rate at which the internal temperature of the heater rises faster than a predetermined rate;

wherein the heater is connected to an electric power source having a stated voltage and experiencing transient variations from the stated voltage, further comprising means for monitoring the transient variations and for comparing the rate of internal temperature rise with the transient variations so that the heating element is deenergized only in response to an abnormal condition not associated with such transient variations.

35. The heater of claim 34, further comprising a portable housing, the heating means being disposed within the portable housing.

36. The heater of claim 35, further comprising a fan within the portable housing for blowing air heated by the heating means from the portable housing.

* * * * *